US012665354B2

(12) United States Patent
He et al.

(10) Patent No.: US 12,665,354 B2
(45) Date of Patent: Jun. 23, 2026

(54) CONNECTOR FOR PREVENTING SIGNAL INTERFERENCE

(71) Applicant: Shenzhen Alex Connector Co Ltd, Shenzhen (CN)

(72) Inventors: Xiling He, Shenzhen (CN); Huilin Wu, Shenzhen (CN); Jijian Wei, Shenzhen (CN); Haiqiu Lu, Shenzhen (CN); Xiao'an Wang, Shenzhen (CN); Xiaobin Wang, Shenzhen (CN); Jun Yang, Shenzhen (CN)

(73) Assignee: Shenzhen Alex Connector Co Ltd, Shenzhen (CN)

( * ) Notice: Subject to any disclaimer, the term of this patent is extended or adjusted under 35 U.S.C. 154(b) by 314 days.

(21) Appl. No.: 18/399,963

(22) Filed: Dec. 29, 2023

(65) Prior Publication Data

US 2025/0183594 A1 Jun. 5, 2025

(30) Foreign Application Priority Data

Nov. 30, 2023 (CN) ......................... 202323271835.4

(51) Int. Cl.
*H01R 13/6581* (2011.01)
*H01R 12/72* (2011.01)
*H01R 13/506* (2006.01)

(52) U.S. Cl.
CPC ....... *H01R 13/6581* (2013.01); *H01R 12/724* (2013.01); *H01R 13/506* (2013.01)

(58) Field of Classification Search
CPC .. H01R 13/40; H01R 13/648; H01R 13/6581; H01R 13/6585; H01R 24/40
See application file for complete search history.

(56) References Cited

U.S. PATENT DOCUMENTS

| | | | | |
|---|---|---|---|---|
| 7,497,724 | B1 * | 3/2009 | Fong | H01R 13/665 439/497 |
| 11,355,875 | B2 | 6/2022 | Wang et al. | |
| 11,646,534 | B2 | 5/2023 | Zhu et al. | |
| 2003/0236021 | A1 * | 12/2003 | Waddell | H01R 13/6585 439/465 |
| 2004/0002262 | A1 * | 1/2004 | Murayama | H01R 13/65918 439/607.1 |
| 2013/0065423 | A1 | 3/2013 | Huang et al. | |
| 2014/0065884 | A1 | 3/2014 | Wu et al. | |
| 2021/0249803 | A1 | 8/2021 | Kojima et al. | |

* cited by examiner

*Primary Examiner* — Oscar C Jimenez

(57) ABSTRACT

The present utility model discloses a connector for preventing signal interference, comprising a plurality of groups of wires and spacers for separating two adjacent groups of the wires, wherein the wires comprise signal wires and ground wires, the ground wires are connected on both sides of the signal wires, and a wire shielding layer is sleeved between the signal wires and the ground wires; a wire clamp is mounted on the spacer, a plurality of bosses are arranged on the spacer, the wire clamp is provided with a plurality of staggered holes matched with the bosses and signal wire holes matched with the signal wires; and the wire clamp and the bosses are snap-fitted via the staggered holes, and the wire shielding layer is connected to the signal wire holes.

16 Claims, 5 Drawing Sheets

A

CONNECTOR FOR PREVENTING SIGNAL INTERFERENCE

CROSS REFERENCE TO RELATED APPLICATION

This application claims priority benefit of Chinese patent Application No. 202323271835.4, filed on Nov. 30, 2023, and the entire contents of which are incorporated herein by reference.

TECHNICAL FIELD

The present utility model relates to the technical field of connectors, and in particular to a connector for preventing signal interference.

BACKGROUND

A connector generally refers to an electrical connector, i.e. a device that connects two active devices to transmit a current or signal. A connector is a common component for electronic engineers that is used for bridging communication between blocked or isolated circuits in a circuitry, so as to allow a current to flow therethrough and enable the circuitry to realize a predetermined function. Connectors are widely applied to the electronic field where a reliable connection between electronic terminal devices and between the electronic terminal devices and a power supply is realized, and the performance of the connector directly influences whether the entire electronic device operates normally or not.

In high-frequency signal connections, a shielding structure of a connector is particularly important. A signal current on the existing connector is prone to dispersion, such that signal wires are affected and interference is caused therebetween, resulting in unstable signals and performance of the existing connector.

SUMMARY

A primary objective of the present utility model is to provide a connector for preventing signal interference, which aims to solve the problems that a signal current is prone to dispersion and the performance is unstable in the existing connector.

In order to achieve the above objective, the present utility model provides a connector for preventing signal interference, comprising a plurality of groups of wires and spacers for separating two adjacent groups of the wires, wherein the wires comprise signal wires and ground wires, the ground wires are connected on both sides of the signal wires, and a wire shielding layer is sleeved between the signal wires and the ground wires; a wire clamp is mounted on the spacer, a plurality of bosses are arranged on the spacer, the wire clamp is provided with a plurality of staggered holes matched with the bosses and signal wire holes matched with the signal wires; and the wire clamp and the bosses are snap-fitted via the staggered holes, and the wire shielding layer is connected to the signal wire holes.

In one embodiment, one group of symmetrical inner side surfaces of the staggered hole are provided as curved surface structures.

In one embodiment, any one of the curved surface structures comprises a first convex surface and a second concave surface, and a distance between the first convex surface and the second concave surface is set to 0.016 cm.

In one embodiment, a width of the boss is set to 0.15 cm and a width of the staggered hole is set to 0.152 cm.

In one embodiment, inner walls of the staggered hole and the boss are in interference-fit connection on at least one surface.

In one embodiment, the wire further comprises an insulating layer, and the insulating layer is sleeved on an outermost layer of the wire.

In one embodiment, the ground wire is arranged in a bent manner, and the ground wire is welded to the wire clamp and the spacer.

In one embodiment, the wire clamp is provided as a structure made of hardware materials.

In one embodiment, the connector further comprises an elastic piece and a PCB board, wherein one end of the elastic piece is connected to the wire, and the other end of the elastic piece is connected to the PCB board.

In one embodiment, the connector further comprises a fixed piece, wherein the fixed piece is arranged at a periphery of the spacer, and the fixed piece is in snap-fit connection with the spacer.

The present utility model has the following beneficial effects.

According to the present utility model, the wire clamp is arranged between the wire and the spacer, and the staggered hole in the wire clamp and the boss on the spacer are snap-fitted, such that a signal on the spacer is guided to sequentially flow to the boss, the wire clamp and the wire shielding layer, which, in turn, prevents the signal on the spacer from dispersing all around, avoids signal interference among the wires, improves the signal connection stability of the connector, and enhances the performance stability of the connector.

BRIEF DESCRIPTION OF DRAWINGS

To more clearly illustrate the technical solutions in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

DESCRIPTIONS OF REFERENCE NUMERALS

Figure 1:
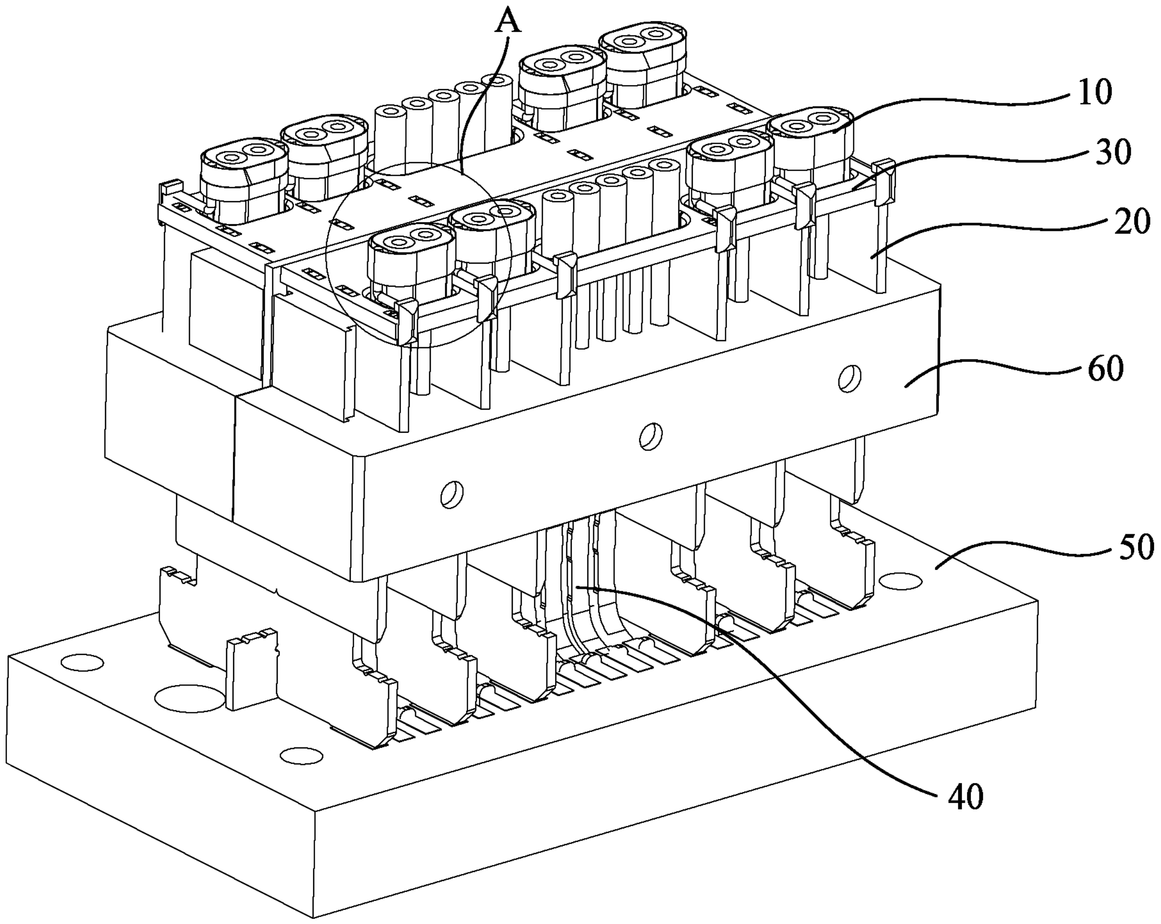
FIG. 1 is a schematic diagram of a structure of a connector for preventing signal interference according to the present utility model.

10: wire; 101: wire shielding layer; 102: signal wire; 103: ground wire; 104: insulating layer; 20: spacer; 201: boss; 30: wire clamp; 301: staggered hole; 3011: first convex surface; 3012: second concave surface; 302: signal wire hole; 40: elastic piece; 50: PCB board; and 60: fixed piece.

The realization of the objectives, the functional features, and the advantages of the present utility model will be further explained in conjunction with the embodiments and with reference to the drawings.

DETAILED DESCRIPTION OF EMBODIMENTS

The technical solutions in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front and rear) are involved in the embodiments of the present utility model, the directional indications are only used to explain the relative positional relationships, the motion situations and the like between individual components under a certain pose (as shown in the drawings), and if the certain pose is changed, the directional indications are changed accordingly.

In addition, if there are descriptions relating to “first”, “second” and the like in the embodiments of the present utility model, the descriptions of “first”, “second” and the like are for descriptive purposes only and are not to be construed as indicating or implying relative importance thereof or implicitly indicating the quantities of the indicated technical features. Thus, a feature defined by “first” or “second” may explicitly or implicitly include at least one such feature. In addition, “and/or” appearing herein is meant to include three parallel solutions, and taking “A and/or B” as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present utility model.

Figure 2:
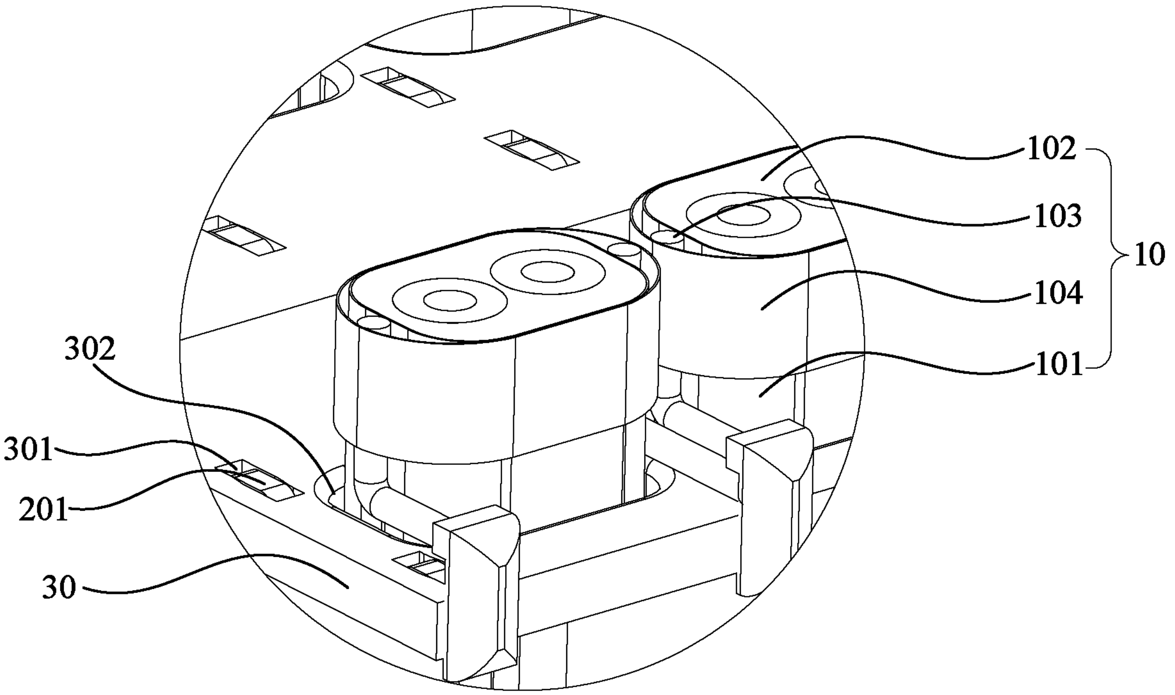
FIG. 2 is an enlarged view of A in FIG. 1.
Figure 3:
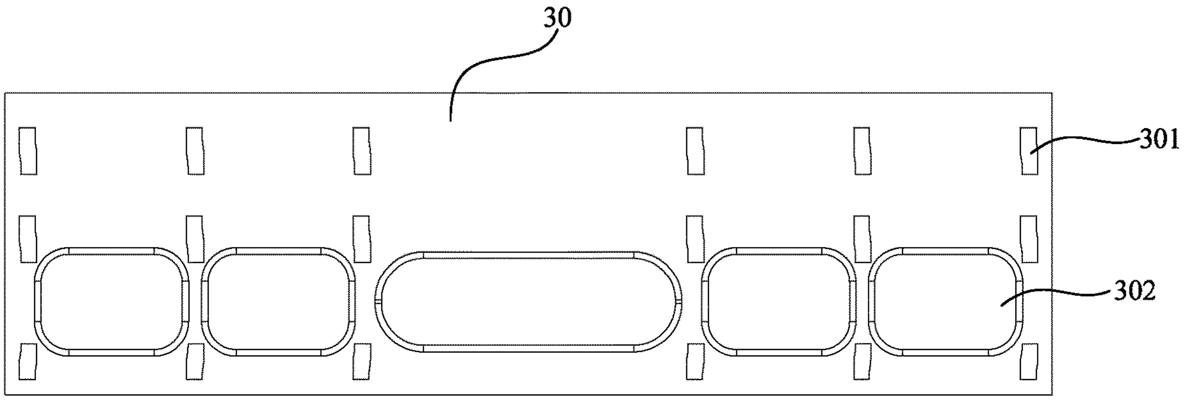
FIG. 3 is a schematic diagram of a structure of a wire clamp according to the present utility model.

Referring to FIGS. 1 and 2, an embodiment of the present utility model provides a connector for preventing signal interference, comprising a plurality of groups of wires 10 and spacers 20 for separating two adjacent groups of the wires 10, wherein the wires 10 comprise signal wires 102 and ground wires 103, the ground wires 103 are connected on both sides of the signal wires 102, and a wire shielding layer 101 is sleeved between the signal wires 102 and the ground wires 103; a wire clamp 30 is mounted on the spacer 20, a plurality of bosses 201 are arranged on the spacer 20, the wire clamp 30 is provided with a plurality of staggered holes 301 matched with the bosses 201 and signal wire holes 302 matched with the signal wires 102; and the wire clamp 30 and the bosses 201 are snap-fitted via the staggered holes 301, and the wire shielding layer 101 is connected to the signal wire holes 302.

According to the present utility model, the wire clamp 30 is arranged between the wire 10 and the spacer 20, and the staggered hole 301 in the wire clamp 30 and the boss 201 on the spacer 20 are snap-fitted, such that a signal on the spacer 20 is guided to sequentially flow to the boss 201, the wire clamp 30 and the wire shielding layer 101, which, in turn, prevents the signal on the spacer 20 from dispersing all around, avoids signal interference among the wires 10, improves the signal connection stability of the connector, and enhances the performance stability of the connector.

Specifically, in this embodiment, the spacer 20 is connected to the wire clamp 30 through the snap-fitting action of the boss 201 and the staggered hole 301, and the wire clamp 30 is designed not only to fix the relative positions of the wire 10 and the spacer 20, but also to guide the flow direction of a signal on the spacer 20, such that the signal current guiding function of the connector is stronger and the performance is more stable, and in order to fix the wire clamp 30 more firmly on the spacer 20, the boss 201 may further be provided with a rotatable buckle or the like to fix the wire clamp 30.

Figure 4:
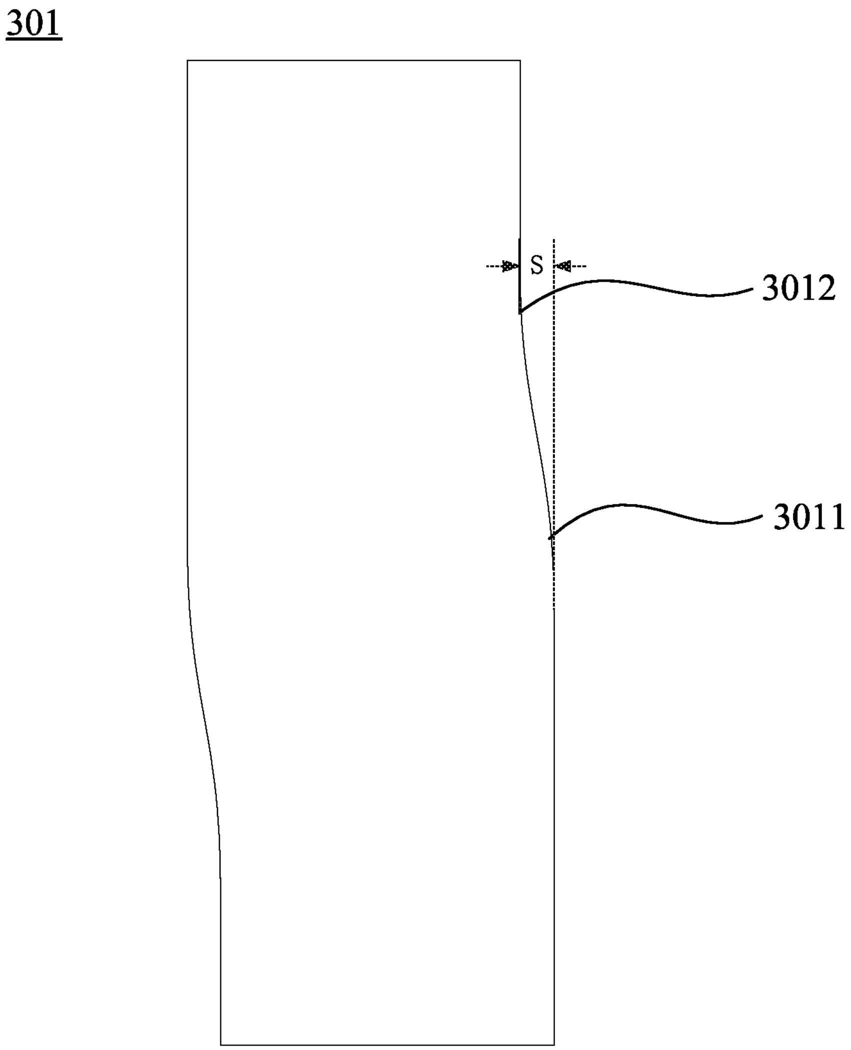
FIG. 4 is a schematic diagram of a structure of a staggered hole according to the present utility model.
Figure 5:
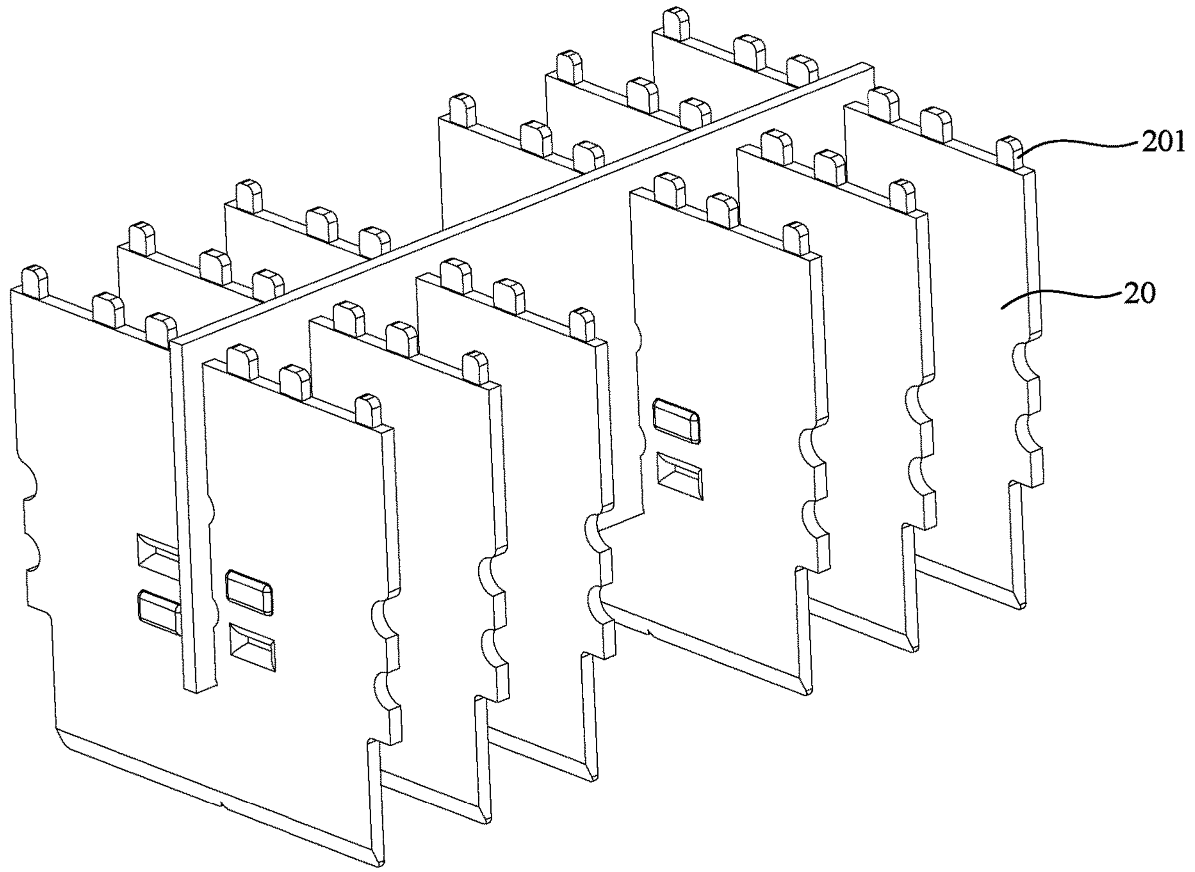
FIG. 5 is a schematic diagram of a structure of a spacer according to the present utility model.

Since the signal current on the spacer 20 needs to flow to the wire clamp 30 through the boss 201, referring to FIGS. 2 and 5, inner walls of the staggered hole 301 and the boss 201 are in interference-fit connection on at least one surface, so as to enable a normal signal transmission between the boss 201 and the staggered hole 301. However, in order to connect the inner wall of the staggered hole 301 to the boss 201, the size of the staggered hole 301 is required to be particularly precise such that the staggered hole 301 and the boss 201 are attached tightly, and meanwhile, this operation also increases the difficulty in snap-fitting of the wire clamp 30 and the boss 201, which not only requires a greater force to assemble the wire clamp 30 to the boss 201, but is also likely to cause the wire clamp 30 or the boss 201 to break due to an excessive force during the assembly process. As such, referring to FIG. 4, one group of symmetrical inner side surfaces of the staggered hole 301 are provided as curved surface structures. Any one of the curved surface structures comprises a first convex surface 3011 and a second concave surface 3012, and a distance(S) between the first convex surface 3011 and the second concave surface 3012 is set to 0.016 cm. A width of the boss 201 is set to 0.15 cm and a width of the staggered hole 301 is set to 0.152 cm. It is ensured that inner walls of the staggered hole 301 and the boss 201 are in interference-fit connection on at least one surface on the premise of convenient mounting, and therefore, the signal current is ensured to be able to pass smoothly.

Referring to FIGS. 1 and 2, the ground wire 103 is arranged in a bent manner, and the ground wire 103 is welded to the wire clamp 30 and the spacer 20. The ground wire 103 is bent by 90 degrees and welded to a side wall of the wire clamp 30, and extends to be partially welded to the spacer 20. The ground wire, the wire clamp, and the spacer are fixed together through soldering tin, ensuring the structural stability.

Referring to FIG. 1, the connector further comprises an elastic piece 40 and a PCB board 50, wherein one end of the elastic piece 40 is connected to the wire 10, and the other end of the elastic piece 40 is connected to the PCB board 50. Both ends of the elastic piece 40 are respectively linked with the wire 10 and the PCB board 50, so as to facilitate the signal transmission between the wire 10 and the PCB board 50. Since the spacers 20 are arranged between two adjacent groups of the wires 10 and between the elastic pieces 40 at intervals, the signal current flows on the spacer 20 as well. Similarly, the boss 201 and the spacer 20 are designed by one-piece molding, so the signal current flows on the boss 201 as well. Finally, the boss 201 guides the signal current to flow to the wire clamp 30 and the wire shielding layer 101, such that the interference caused between the signal wires 102 is affected because the signal current is prevented from dispersing all around the spacer 20.

Referring to FIG. 1, the wire clamp 30 is provided as a structure made of hardware materials. Since the wire clamp 30 has the function of guiding the signal current, the wire clamp 30 is provided as a structure made of conductive materials such as brass, stainless steel plating, etc., so as to ensure the wire clamp 30 to perform the conductive function. Similarly, the wire shielding layer 101 is provided as a structure made of conductive aluminum foil, an outer wall of the wire shielding layer 101 is in contact with the signal wire hole 302, such that the signal current on the wire clamp 30 can flow to the wire shielding layer 101.

In order to ensure the safety of the connector during use, referring to FIG. 2, the wire 10 further comprises an insulating layer 104, and the insulating layer 104 is sleeved on an outermost layer of the wire 10. The insulating layer 104 is sleeved on the outermost layer of the wire 10 to insulate and protect the wire 10, such that the safety is improved.

Referring to FIG. 1, the connector further comprises a fixed piece 60, wherein the fixed piece 60 is arranged at a periphery of the spacer 20, and the fixed piece 60 is in snap-fit connection with the spacer 20. The fixed piece 60 is provided as a plastic one-piece molded structure. The plastic material is of a certain elasticity, which allows the fixed piece 60 to be tightly snap-fitted outside the spacer 20, function as a buffer protection for the entire connector, and serve the purpose of insulation protection, such that the safety of the connector is improved.

The above mentioned contents are only optional embodiments of the present utility model and are not intended to limit the patent scope of the present utility model, and under the inventive concept of the present utility model, the equivalent structural transformations made by using the contents of the specification and the drawings of the present utility model, or direct/indirect applications to other related technical fields, are all included in the patent protection scope of the present utility model.

What is claimed is:

1. A connector for preventing signal interference, comprising a plurality of groups of wires and spacers for separating two adjacent groups of the wires, wherein the wires comprise signal wires and ground wires, the ground wires are connected on both sides of the signal wires, and a wire shielding layer is sleeved between the signal wires and the ground wires; a wire clamp is mounted on the spacers, a plurality of bosses are arranged on each spacer, the wire clamp is provided with a plurality of staggered holes matched with the bosses and signal wire holes matched with the signal wires; and the wire clamp and the bosses are snap-fitted via the staggered holes, and the wire shielding layer is connected to the signal wire holes;

wherein the wire clamp is made of conductive material.

2. The connector for preventing signal interference according to claim 1, wherein two opposite inner side surfaces of each staggered hole are provided as curved surface structures;

wherein a portion of each of the two opposite inner side surfaces projects inward so as to form a first convex surface and a second concave surface.

3. The connector for preventing signal interference according to claim 2, wherein a distance between the first convex surface and the second concave surface is set to 0.016 cm.

4. The connector for preventing signal interference according to claim 2, wherein the first convex surfaces of the two opposite inner side surfaces are rotational symmetric with respect to an axis of each staggered hole, and the second concave surfaces of the two opposite inner side surfaces are rotational symmetric with respect to the axis of each staggered hole.

5. The connector for preventing signal interference according to claim 4, wherein the first convex surfaces of the two opposite inner side surfaces are 180-degree rotational symmetric with respect to the axis of each staggered hole, and the second concave surfaces of the two opposite inner side surfaces are 180-degree rotational symmetric with respect to the axis of each staggered hole.

6. The connector for preventing signal interference according to claim 1, wherein a width of each boss is set to 0.15 cm and a width of each staggered hole is set to 0.152 cm.

7. The connector for preventing signal interference according to claim 1, wherein inner walls of the staggered holes and the bosses are in interference-fit connection on at least one surface.

8. The connector for preventing signal interference according to claim 1, wherein each group of wires is sleeved with an insulating layer.

9. The connector for preventing signal interference according to claim 1, wherein each ground wire is arranged in a bent manner, and the ground wires are welded to the wire clamp and the spacers.

10. The connector for preventing signal interference according to claim 1, further comprising an elastic piece and a PCB board, wherein one end of the elastic piece is connected to the plurality of groups of wires, and an other end of the elastic piece is connected to the PCB board.

11. The connector for preventing signal interference according to claim 1, further comprising a fixed piece, wherein the fixed piece is arranged at a periphery of the spacers, and the fixed piece is in snap-fit connection with the spacers.

12. The connector for preventing signal interference according to claim 1, wherein the wire shielding layer is made of conductive material.

13. The connector for preventing signal interference according to claim 12, wherein the wire shielding layer is an aluminum foil.

14. The connector for preventing signal interference according to claim 1, wherein the wire clamp is made of brass or stainless steel.

15. The connector for preventing signal interference according to claim 1, wherein each spacer and the bosses thereon are formed as one-piece structure.

16. The connector for preventing signal interference according to claim 1, wherein a signal on the spacers is guided to sequentially flow to the bosses, the wire clamp and the wire shielding layer.

* * * * *